United States Patent

Tran et al.

[11] Patent Number: 5,123,368
[45] Date of Patent: Jun. 23, 1992

[54] LAMINAR AIR-FLOW SAIL

[76] Inventors: Duc H. Tran, P.O. Box 1015, Santa Ana, Calif. 92702; David A. Reed, Jr., 914 Fairview St., Anaheim, Calif. 92801

[21] Appl. No.: 692,272

[22] Filed: Apr. 26, 1991

Related U.S. Application Data

[63] Continuation of Ser. No. 475,451, Feb. 6, 1990, abandoned.

[51] Int. Cl.$^5$ .............................................. B63H 9/04
[52] U.S. Cl. ...................................... 114/103; 244/198
[58] Field of Search ................ 114/103, 102; 244/145, 244/198; 135/383 R, 384 R

[56] References Cited

U.S. PATENT DOCUMENTS

| | | | |
|---|---|---|---|
| 721,286 | 2/1903 | Couch | 114/103 |
| 1,516,063 | 11/1924 | Scammell | 114/103 X |
| 1,613,348 | 1/1927 | Falkentahl | 244/198 |
| 1,808,996 | 6/1931 | Royster | 244/198 |
| 1,864,964 | 6/1932 | Vaile | 114/103 |
| 1,902,553 | 3/1933 | Goldsmith | 139/383 R |
| 1,918,536 | 7/1933 | Griswold | 244/210 |
| 2,651,481 | 8/1953 | Steinthal | 244/145 |
| 3,174,453 | 3/1965 | Lemoigne | 114/103 |
| 3,222,016 | 12/1965 | Boone | 244/145 |
| 3,250,662 | 5/1966 | Seaman | 161/91 |
| 3,393,885 | 7/1968 | Neumark | 244/145 |
| 3,776,170 | 12/1973 | Slemmons | 114/103 |
| 3,867,894 | 2/1975 | Vicard | 114/102 |
| 4,006,701 | 2/1977 | Corbellini | 114/102 |
| 4,191,349 | 3/1980 | Pravaz | 244/145 |
| 5,031,560 | 7/1991 | Stearns, IV | 114/103 |

FOREIGN PATENT DOCUMENTS

| | | | |
|---|---|---|---|
| 701079 | 1/1965 | Canada . | |
| 2499503 | 8/1982 | France | 114/103 |
| 0184096 | 10/1984 | Japan | 114/103 |
| 2216858 | 10/1989 | United Kingdom | 114/103 |

OTHER PUBLICATIONS

"Handbook of Airfoil Sections for Light Aircraft," M. S. Rice, Aviation Publications, 1971.

Primary Examiner—Sherman D. Basinger
Attorney, Agent, or Firm—Roberts and Quiogue

[57] ABSTRACT

Rows of closely spaced apertures are installed in a sail to control boundary layer air flow over a sail to laminar flow type by "bleeding" high energy air from the windward or concave side of the sail through the apertures to the convex or leeward side of the sail. The "bleed air" vents the windward boundary layer air through the apertures, gently lifts the leeward or convex side boundary layer off the sail surface; then new laminar boundary layers are formed, on each side of the sail, downwind of the aperture. The increase in air energy adjacent to the sail surface maintains desirable air flow velocity and pressure gradients on the sail that prevents flow separation. The apertures permit large camber of sail contour and high angles of attack without stalling. The air "bleeding" action continuously removes old boundary layer air and creates new laminar boundary air layers on the sail. The energy in the boundary layer air on both sides of the sail is increased which prevents thick, turbulent boundary layers of air from forming laminar air flow and provides high dynamic lift forces because less of the wind energy is wasted.

26 Claims, 7 Drawing Sheets

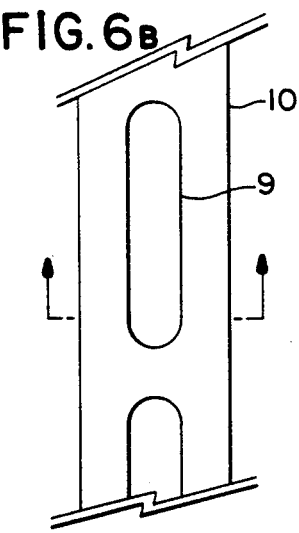
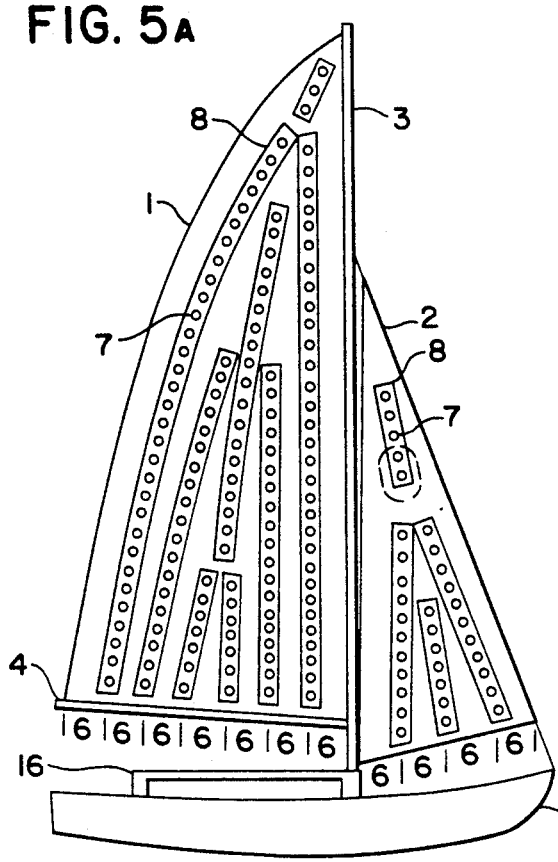
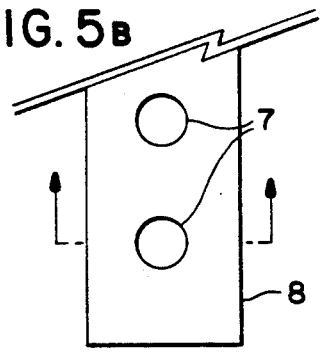
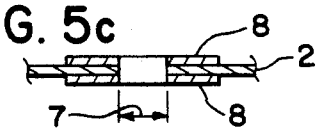
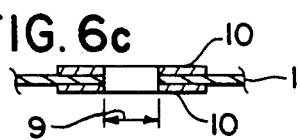
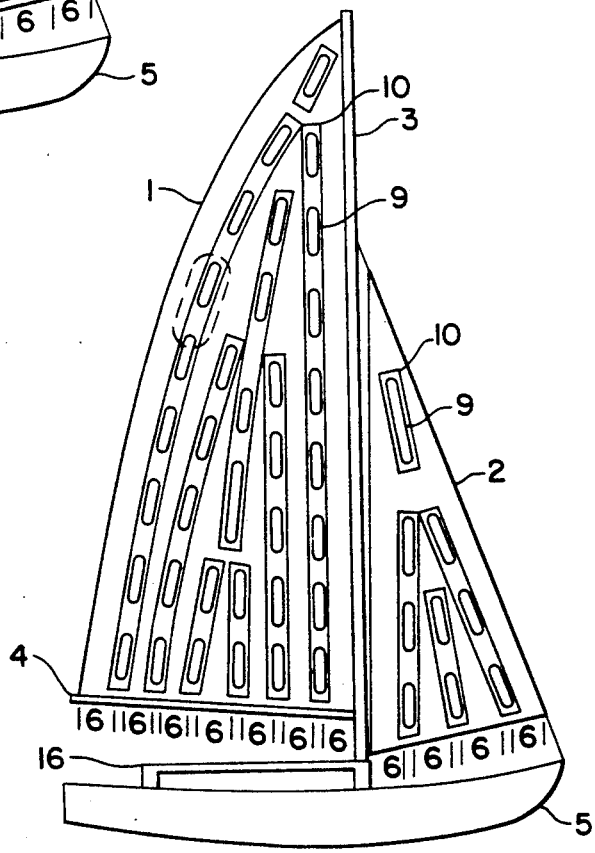

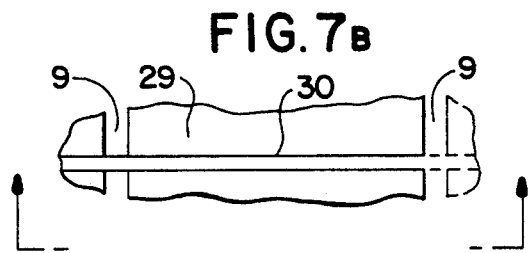
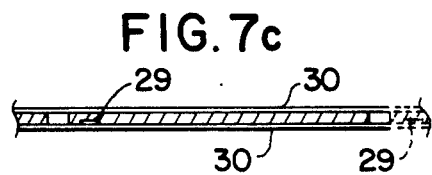
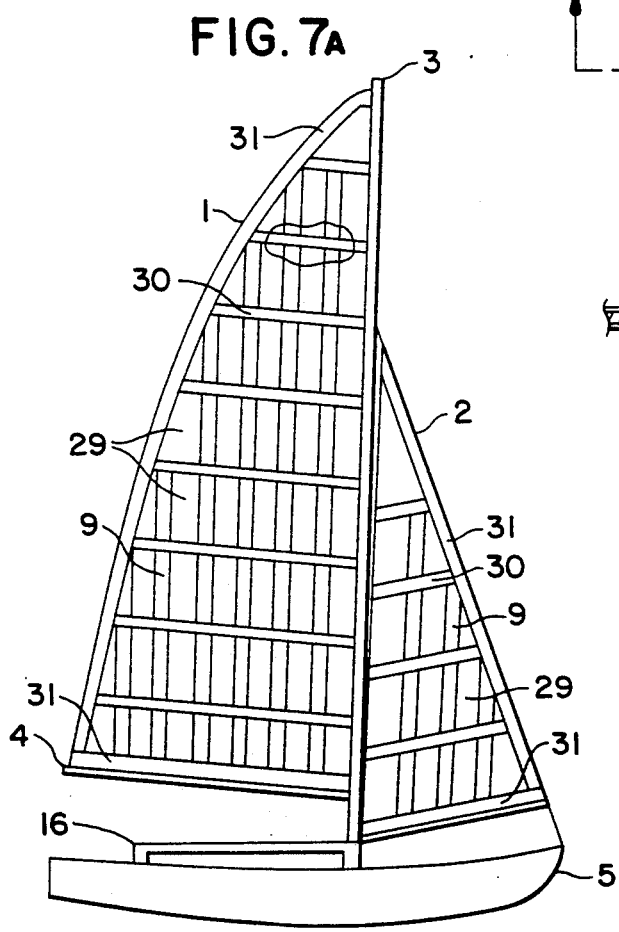

FIG. 8A
FIG. 8B
FIG. 8C
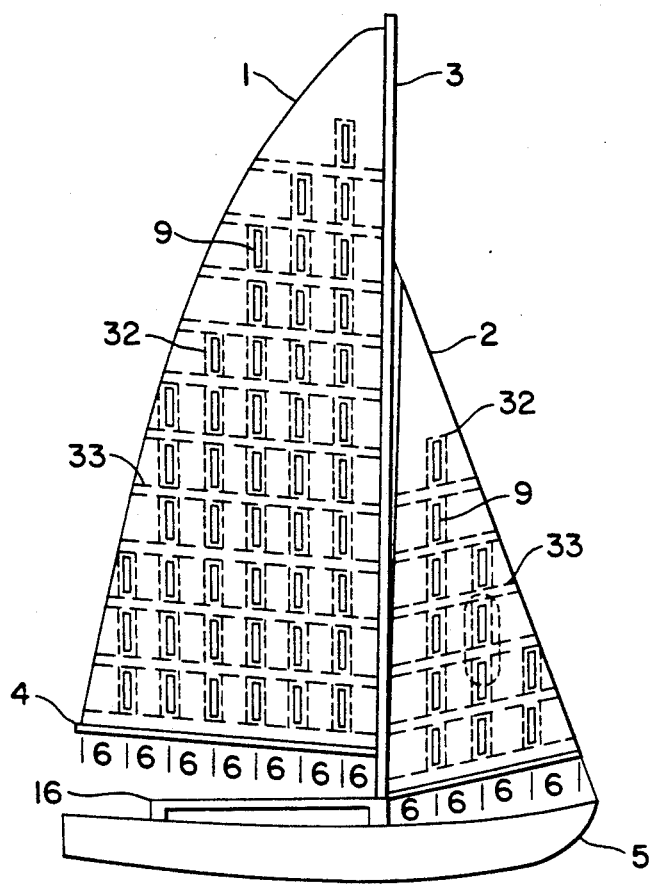
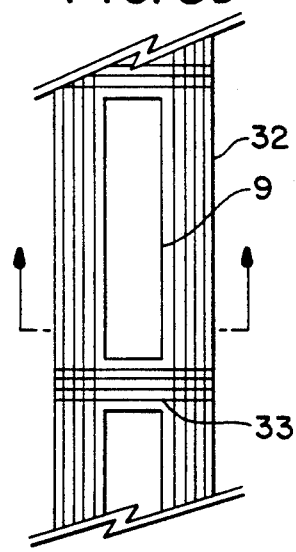
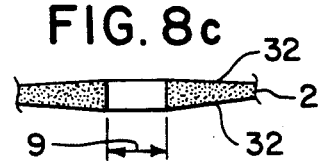

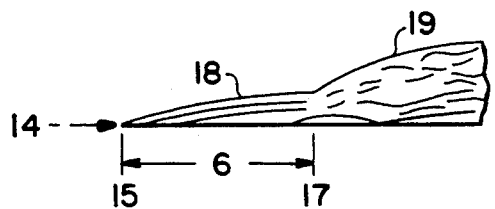
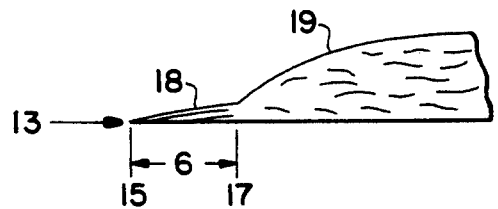
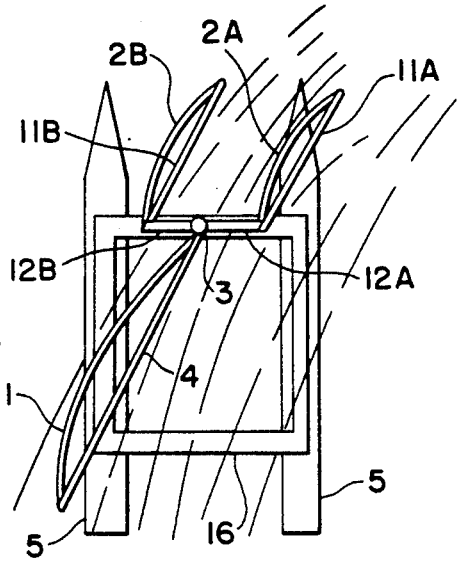
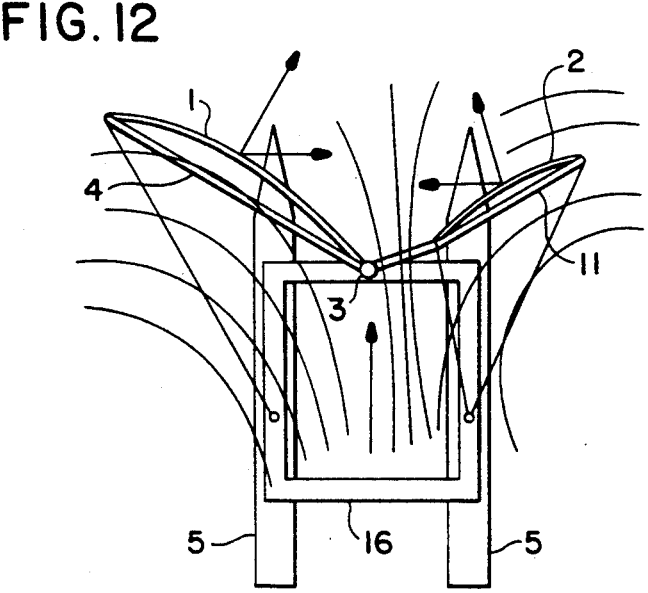

LAMINAR AIR-FLOW SAIL

This is a continuation of application Ser. No. 07/475,451, filed Feb. 6, 1990, and now abandoned, entitled "Laminar Air-Flow Sail," by Duc Huu Tran and David A. Reed, Jr.

BACKGROUND OF THE INVENTION

A sail may be considered a thin cambered airfoil shaped surface where the maximum aerodynamic efficiency is obtained when functioning as a laminar air flow device. The present invention involves the use of laminar air flow control means to improve sail performance.

U.S. Pat. No. 2,971,488 shows a sailboat with one long line of single holes disposed along the rear or trailing edge of the sail and just ahead of a hinged boom and sail flap arrangement that terminates the trailed edge of the sail. This single line of relatively large holes is intended to prevent turbulence at the trailing edge of the sail.

U.S. Pat. No. 1,864,964 shows a sail boat wherein fabric scallops or pockets are provided near the leading edge of the sail adjacent the mast. These pockets are directed to one side of the sail or the other by means of ropes under control of the helmsman. The stream caused by the pockets deflects the air stream away from the leeward side of the sail to increase the negative pressure at that area adjacent the front or mast zone of the sail. In FIG. 6 a parachute is shown having a double circumferential row of large apertures. Diagonally disposed pairs of two holes are thus formed, each sharing a common hole, so that the converging ends of each hole row are not spaced. The apertures form horizontal streams that deflect the normal air current to a path further away from the parachute canopy than would be their path if the apertures were absent.

Canadian Patent No. 701,079 shows rows of orifice jets formed over substantially the entire surface of the sail. The orifices direct the air flowing therethrough tangentially along the convex or leeward side of the sail. The orifices are produced by having the down wind edge of the orifice tight and the upward edger loosely crowned and positioned to the leeward side of the sail. These slots are all intended to act as reactive jets. The large orifices produce jets of air similar to slots like those between a wing and trailing edge flaps without creating laminar-type air flow.

U.S. Pat. No. 3,776,170 shows a sail provided with short rows of closely spaced holes, with the axis of the rows converging and being inclined at an acute angle to the path of the free air past the sail. The converging ends of the individual rows are relatively widely spaced and the rows are arranged in an array from the head to the foot of the sail. The angle between the axis of each row of holes and the direction of the free air flow path is alternated along the array from a positive to negative angle. The rows of holes, in turn, produce a row of discrete air jets on the convex, low pressure side of the sail, forming aerodynamic "fences." These fences present a partial obstruction to the flow of the air past the sail, causing the air to form twisted streams when spilling over the aerodynamic fences. These streams form continuous, helical trailing vortices that mix the free air stream with the slower moving boundary layer of the air next to the convex surface of the sail. The resulting mixing action continually energizes the boundary layer of air, thus preventing stall and improving the driving force of the sail. The principle is said to be also useful in the control of parachutes and other thin air foils.

U.S. Pat. No. 3,152,782 shows a parachute wherein frusto-conical nozzles terminating in tubular extensions are formed in staggered circumferential rows around a specially provided torodial bulge adjacent the lower portion of the parachute canopy. These nozzles are provided to maintain a constant turbulence around the canopy bulge. The nozzles form interlaced or crossing rows of three, each row of three sharing a common nozzle, so that the rows of three have no gap between them at the converging end of the rows.

None of the above references describe a device which provides apertures that maintain laminar-type air flow over the entire surface of a sail. None of these references describes a device designed to "bleed" the high energy windward or concave side air to the leeward or convex side of a sail to replace the boundary layers on both sides of a sail with no laminar flow-type boundary layers down stream of the apertures in the direction of the passing air flow.

SUMMARY OF THE INVENTION

Low energy content and unfavorable pressure gradients are the main causes for boundary layer air to separate from a surface. This invention describes a method to establish and maintain the flow of boundary layer air over a sail to laminar flow-type. Rows of closely spaced apertures are installed in a sail to "bleed" high energy air from the windward or concave side of the sail through the aperture to the leeward side of the sail. The "bleed" process removes the windward side boundary layer and gently lifts the leeward or convex side boundary layer off the sail starting a new laminar-type boundary layer on each side of the sail downwind of the aperture. The air "bleed" action continuously energizes the boundary layer air on both sides of the sail, preventing thick, turbulent boundary layers from forming. The laminar flow obtained provides high dynamic lift forces over the total area on both sides of the sail.

BRIEF DESCRIPTION OF THE DRAWING

These and other features and advantages of the present invention will become more apparent from the following detailed description of an exemplary embodiment thereof, as illustrated in the accompanying drawings, in which:

FIG. 5a is an elevation view of a catamaran with a main and jib sails that have two reinforced aperture patterns that are holes. Pattern 1 is located parallel to and numbered from the stern and pattern 2 parallel to and numbered from the bow edge of the sail respectively. The row patterns intercept each other when extended upward from the bottom to the top of the sail. Preferred intersections are row 1 of pattern 1 with row 1 of pattern 2 and remaining rows in sequence until all intersections occur. Row patterns may come in conflict with each other and rows near the centerline of the sail and are adjusted to "best fit" conditions.

FIG. 5b is an inset view of a jib sail that shows a pair of holes and hole reinforcement that is typical of all tape-like reinforced sails.

FIG. 5c is a section cut taken in FIG. 5b that shows the location of hole reinforcement on each side of the jib sail.

FIG. 6a is an elevation view of a catamaran showing a main and jib sails equipped with reinforced slot-type laminar air flow control system located in patterns as in FIG. 5a.

FIG. 6b is an inset view of the jib sail that shows a pari of slots and slot reinforcement that is typical of all tape-like slot reinforcements.

FIG. 6c is a section cut defined in FIG. 6b that shows the location of slot reinforcement on each side of the jib sail.

FIG. 7a is an elevation view of a catamaran showing a main and jib sails equipped with a panel and strip slot-type laminar air flow control system.

FIG. 7b is an inset view of the main sail taken of the indicated area of FIG. 7a showing the location of the panels and cross-plied strips.

FIG. 7c is a section view taken in FIG. 7b that shows the panels with reinforcement strips on each side of the panels.

FIG. 8a is an elevation view of a catamaran showing a main and jib sails equipped with a slot-type laminar air flow. control system.

FIG. 8b is an inset view taken in FIG. 8a that shows the larger thread area that replaces the reinforcing tape.

FIG. 8c is a section view taken in FIG. 8b which shows the reinforcing thread location adjacent the edges of the apertures.

FIG. 11a is a diagram of laminar and turbulent flow boundary layer shapes for boundary layer flow as they would appear in a low velocity relative wind.

FIG. 11b shows the same laminar and turbulent flow boundary layer shapes as they would appear in a high velocity relative, wind.

FIG. 12 is a plan view of a catamaran with main and jib sails rigged as a sail combination where air is smoothly diverted outward from the centerline to each side of the catamaran to obtain the equivalent of a "steam impulse wheel" type force.

FIG. 13 is a plan view of a catamaran showing a main sail and two positions of a jib sail.

DETAILED DESCRIPTION OF THE PREFERRED EMBODIMENT

Figure 1:
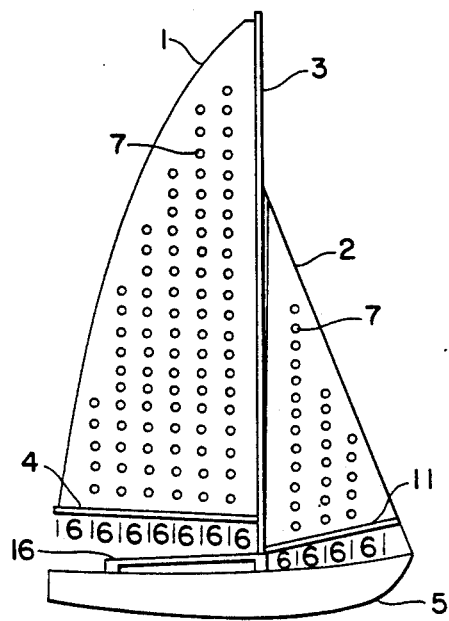
FIGS. 1 and 3 are elevation view of a catamaran showing a main and jib sails equipped with rows of unreinforced apertures.

FIG. 1 is an elevation view of a catamaran that shows a main sail 1, a jib sail 2, rows of unreinforced holes 7 spaced at distance 6 from main sail 1 and jib sail 2 stern edges, and rows spaced from each other, to form the equivalent of air "bleed" slots. The rows of holes 7 are aligned perpendicular to the relative wind. The "nth" hole in each row is aligned with adjacent row "nth" hole in line with the relative wind. The interior edge of the hole is reinforced by a buttonhole type stitch to strengthen the hole edge and prevent the sail material from fraying. The general aperture arrangement is to space rows of apertures from the sail edges, and rows from each other, perpendicular to the direction of air flow along a sail surface. Aperture width and row spacing distances are generally along the direction of local air flow. The use of unreinforced apertures is the simplest version of a laminar flow control system installed in accordance with this invention.

Figure 2:
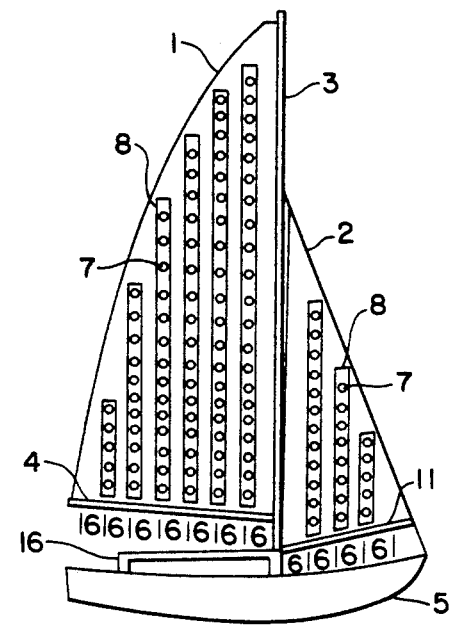
FIGS. 2 and 4 are elevation views of a catamaran showing a main and jib sails equipped with rows of reinforced apertures.

FIG. 2 is an elevation view of a catamaran showing a main sail 1, a jib sail 2, rows of holes 7, and hole reinforcement 8. The arrangement of holes 7 is the same described with respect to FIG. 1 above. Hole reinforcement material 8 is installed centered on the axis of the holes 7. The reinforcement material 8 is preferably served edge tape 8 bonded to the sails in the locations described. Tapes 8 may be sewn on the sail using a buttonhole stitch around the hole edges and rows of stitches parallel with the edges of the tapes 8 to complete the reinforcement attachment to the sails. The aperture reinforcement is preferably of high strength and stiffness to allow the closest possible spacing of apertures along the centerline of the row of apertures. Apertures may be holes or slots.

Figure 3:
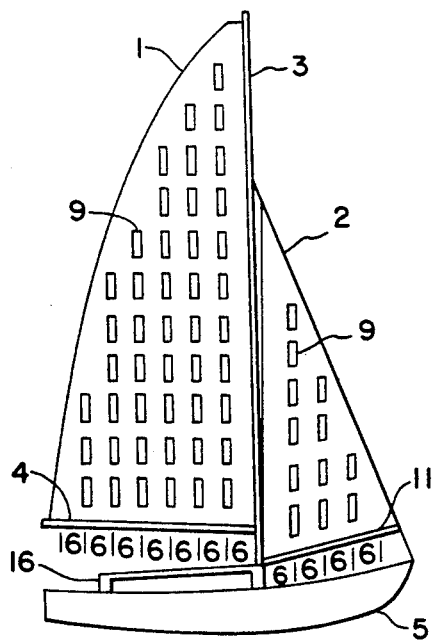
Figure 4:
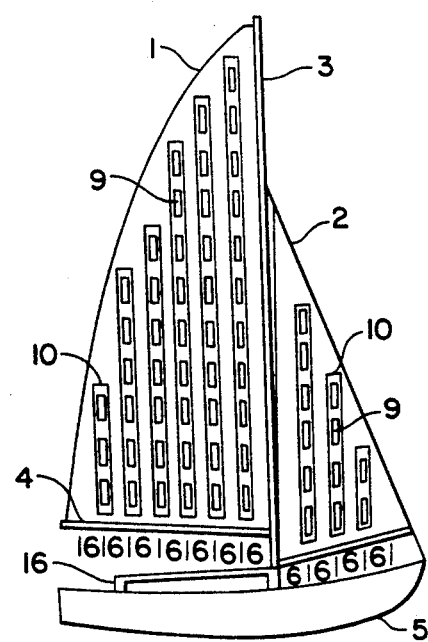

FIGS. 3 and 4 are elevation view of a catamaran showing a main sail 1, a jib sail 2, with rows of apertures of unreinforced and reinforced slots 9, respectively, which perform as air "bleed" slots. The rows of slots 9 are arranged as described for holes 7 in FIG. 1. The unreinforced slot 9 edge of FIG. 3 is reinforced by buttonhole stitches to prevent the edges of hole 7 from fraying. The reinforcement 10 is preferably bonded to the sail as shown in FIG. 4. Reinforcement 10 may be attached to the sail by a buttonhole stitch around the slot 9 edge and rows of stitches parallel to the edges of the reinforcement 10 that is consistent with conventional sail making.

FIG. 5a is an elevation view of a catamaran showing a main sail 1, a jib sail 2, and two rows of hole reinforcement 8. Pattern 1 rows of holes 7 are spaced 6 and numbered from the stern edges of main sail 1 and jib sail 2, respectively. Pattern 2 rows are spaced 6 from bow edges of main sail 1 and jib sail 2, and from each other to form the equivalent of air "bleed" slots. The rows intersect when extended from the sail base to the top of the sail. Row pairs intersect where the row 1 from pattern 1 meets row 1 of pattern 2, and each successive row pair thereafter until a row pair intersection occur. Where stern and bow patterns of holes 7 may be in conflict, the rows near the center of the sail are adjusted to "best fit" condition. Numbering the hole locations from the base to the top of the sail where the "ith" hole 7 are reinforced with preferably thin high strength and stiffness material 8 shown in FIG. 5b to permit the closest possible spacing of holes along the row. Hole reinforcement 8 may be preferably bonded to each side of the sail 1 as shown in FIG. 5c or sewn in place with buttonhole stitch on the hole 7 edge and rows of stitches sewn parallel to the length edge of reinforcement 8 as required to properly resist forces internal to the sail material.

FIG. 6a is an elevation view of a catamaran showing a main sail 1, a jib sail 2, slots 9, and slot reinforcement 10. The arrangement of slots is similar to the arrangement of holes in FIG. 5a. The rows of slots 9 are reinforced preferably with thin high strength and stiffness material 10 shown in inset view 6b to obtain the longest slots at the closest possible spacing. Slot reinforcement 10 is preferably bonded to each side of the sail material as shown in the view section of FIG. 6c. The slot reinforcement 10 may also be attached to the sail with high strength thread using buttonhole stitches around the edge of the slot and rows of stitches parallel to the reinforcement 10 edges installed as may be required to properly resist the internal forces of the sail material.

FIG. 7 is an elevation view of a catamaran showing a main sail 1, a jib sail 2, panels 29, strips 30, and sail edge elements 31 assembled by bonding to form a slot type sail. Panels, of sail material with width equal to laminar-flow transitions-length are spaced a slot width apart and cross plied with narrow strips bonded to each side of the panels. The length of slots 9 formed is dependent upon the strength and stiffness of the panel and strip material. Additional elements close all edges of the sail assembly to form a smooth contour. The panels 29 are aligned parallel to each other and oriented perpendicular to the relative wind. Narrow strips 30 are cross-plied parallel to the relative wind flow and preferably bonded to each side of the panels 29, as shown in FIGS. 6b and 6c. Elements 31 are preferably bonded to all edges of the sail to form a complete uniform sail surface. However, panels 29 and strips 30 and other sail elements may be sewn together, but with considerable difficulty and loss of overall sail smoothness and strength.

FIG. 8a is an elevation view of a catamaran showing a main sail 1, a jib sail 2 equipped with slot-type laminar air flow control system that is integrally woven into the sail material. Larger diameter thread is woven into the sail replacing the reinforcing type and the slot spacing sail material shown in FIG. 4. Tape replacement thread 32 is woven into the sail perpendicular to the relative wind and slot spacing material replacement thread 33 is woven into the sail parallel to the relative wind as shown in FIG. 8b. FIG. 8c is a section view located in FIG. 8b of the larger thread areas. Thread 32 and 33 diameters are sized as may be required to resist internal sail forces. The slot when cut through the sail material in between the large thread material may be as long as the size, strength and stiffness the thread permits. Additional elements 31 are bonded to all edges of the sail assembly to form a smooth contour. The use of integrally woven sail reinforcements produces the strongest and smoothest sail contour possible when laminar flow control is installed in accordance with this invention.

Figure 9A:
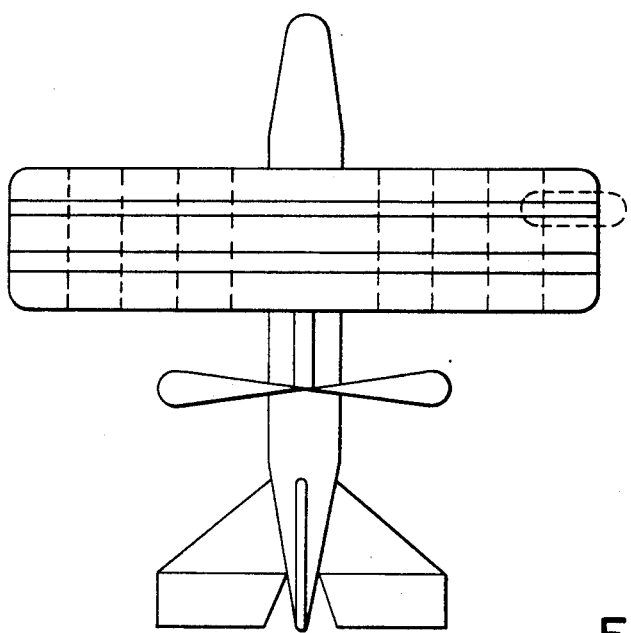
FIG. 9a is a plan view of an airplane designed to fly with a single layer of material shaped like a thin cambered airfoil.
Figure 9B:
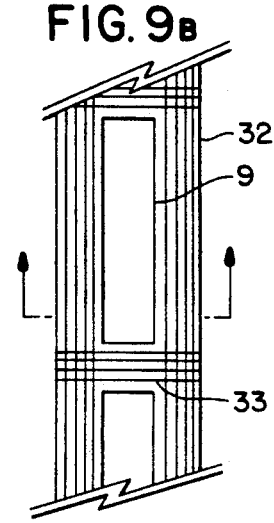
FIG. 9b is a wing inset view located in FIG. 9a that shows an enlarged detail of thread material surrounding a slot, rotated 90 degrees counterclockwise.
Figure 9C:
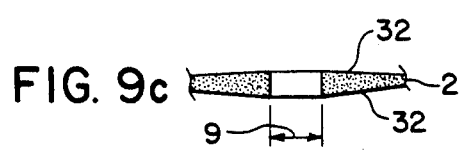
FIG. 9c is a section cut located in FIG. 9b that shows the larger more dense thread material adjacent to a slot.

FIG. 9a is a plan view of an airplane, designed to fly with a single layer of the airfoil shaped material, constructed similar to the design of the sail 8 with the rows of slots 9 and reinforcement threads 32 oriented parallel to the leading edge of the wing are shown in FIG. 9b. The narrow thread 33 of claim 8 is oriented parallel to the local air flow in a position equivalent to a wing rib. Some of the narrow thread 33 groups may be enlarged in width to permit a passage to be installed that contains a rigid structure shaped to the desired airfoil contour. The airfoil shape structure when attached to the wing lead edge, spar if any, and wing trailing edge structure completes the planform requirements of the wing. The tips of the wings are terminated with a panel contoured in planform of a low velocity aircraft wing tip design. FIG. 9c shows the larger, more dense thread material adjacent to the slot.

Figure 10A:
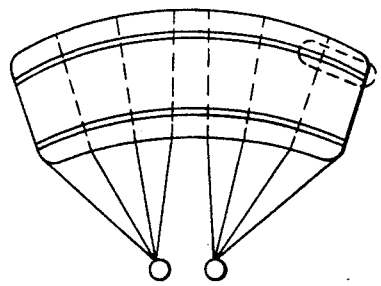
FIG. 10a is a view of a glidechute type of parachute canopy equipped with riser lines.
Figure 10B:
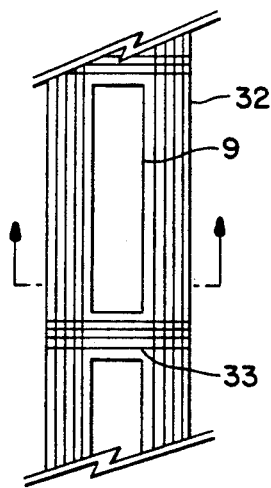
FIG. 10b is a section cut located in FIG. 10a that shows an enlarged detail of thread material surrounding a slot, rotated 90 degrees counterclockwise.
Figure 10C:
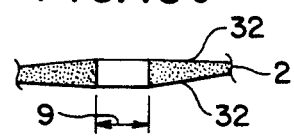
FIG. 10c is a section cut located in FIG. 10b that shows the location of enlarged thread material adjacent to the edges of a slot.

FIG. 10a illustrates a glidechute-type parachute canopy with reinforcements integrally woven into the canopy material. The canopy design is patterned after the wing of the airplane of FIG. 9 above wherein the slots and reinforcing threads are oriented parallel to the canopy leading edge. The narrow thread reinforcement areas are located parallel to the local air flow over the canopy. The thread 32 and slots 9 are oriented perpendicular to the wind, or parallel to the parachute leading edge as shown in the 90 degree rotated view 10b. Thread 33 reinforcement material is oriented parallel to the relative wind. The canopy is connected to riser lines that are attached to a deployment bag and harness assembly (not shown) of standard glidechute design. Riser lines are attached in the same manner as a glidechute canopy that permits maneuvering the canopy as would be the use of a normal glidechute canopy.

FIG. 11 is a diagram of laminar flow 18 and turbulent flow 1 boundary layer shapes for low 14 and high 13 velocity air streams over a flat plate. FIG. 11a shows the shape of laminar 18 and turbulent 19 flow boundary layers as they would appear in a low velocity 14 relative wind. FIG. 11b shows the same laminar 18 and turbulent flow shapes as they would appear in a high velocity relative wind. The flow of air over a flat surface will change from laminar flow 18 to turbulent flow 19 at a distance 6 from the leading edge of a flat surface when the Reynolds number is between 500,000 and 600,000, which occurs at location 17 (see *Principals of Aerodynamics*, by Dwinnell, 1949). Distance 6 is obtained by multiplying a Reynolds number equal to said values by the air kinematic viscosity and dividing by the relative wind velocity. The sail design for distance 6 depends on the range of relative wind velocity expected to flow over the sail. High relative wind velocity produces the smallest value for distance 6. Reynolds numbers and air kinematic viscosity values may be found in airplane design manuals.

FIG. 12 is an elevation view of a catamaran showing a main sail 1, a jib sail 2, a jib sail spreader 11, and a jib sail positioner 12. Main 1 and jib 2 sails are configured so that air is smoothly diverted outward from the centerline to each side of the catamaran to obtain the functional equivalent of a "steam impulse wheel" type force on the sails, as well as laminar-flow aerodynamic lift when sailing generally down wind. The sail angles of attack to the relative wind are set to minimize roll moments about the catamaran longitudinal axis while maximizing force magnitude on the sails in the desired course direction. The sails 1 and 2 in positions shown are preferred for relative wind coming from small angles from aft to starboard of the stern of the catamaran. When the relative wind comes from a similar port side angle the sails are repositioned with the main sail 1 of the starboard side and the jib sail 2 repositioned to the prot side of the catamaran. The impulse forces are obtained by diverting the relative wind to the largest possible vector angles away from the catamaran centerline. When the wind vectors are turned at angles greater than 90 degrees the impulse force coefficients of the sail assembly may exceed 1 with a theoretical maximum value of 2 at 180 degrees of turning angle. The camber of the sail may be increased when the diverting angles exceed 90 degrees as long as luffing on the sail does not occur.

FIG. 13 is an plan view of a catamaran showing a main sail and two positions of a jib sail 2, a jib sail spreader 11, and jib sail positioner 12. The jib sail 2 has preferred position 2a for relative wind flowing from the stern to the bow of the catamaran. The position 2a locates the jib sail 2 in the nonturbulent down-wash of the main sail 1 down-wash air stream. For air flowing from bow to stern of the catamaran, the jib sail 2 is placed in position 2b which locates the main sail 2 in the nonturbulent downwash air from the jib sail 2.

The jib sail spreader 11 configured the jib sail 2 to best shape of cambered curvature and reduces the luffing when changing position of jib sail 2. Jib sail positioner 12 enables the jib sail 2 to be quickly positioned under controlled conditions. The jib sail spreader and jib sail positioner shown quickly permit locating the jib sail into preferred "clean air" position on the windward side of the main sail. The alternate position for the jib sail on the leeward side of the main sail is the usual location for the jib sail.

Figure 14A:
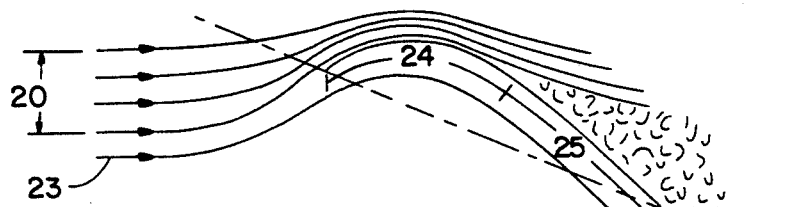
FIG. 14a is a cross-section view of a normal sail showing flow separation that occurs at high angles of attack to the relative wind.
Figure 14B:
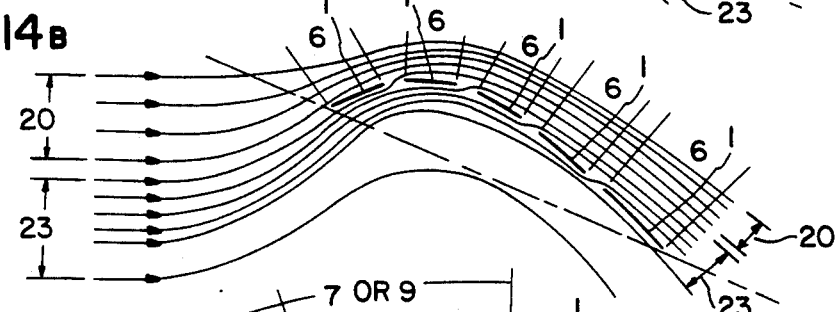
FIG. 14b is a view of the sail cross-section showing flow attachment at the same high angles of attack of the sail in FIG. 14a with laminar flow control elements installed in accordance with the invention.
Figure 14C:
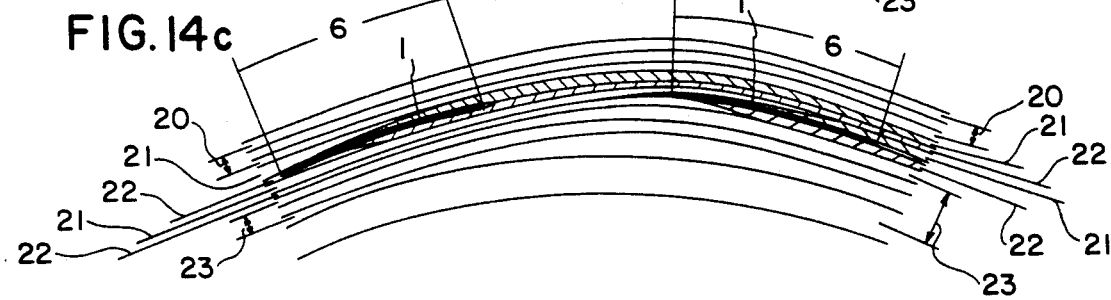
FIG. 14c is an enlarged view of an aperture detailing how several airstream layers function to maintain laminar flow when said apertures are installed in accordance with this invention.
Figure 15A:
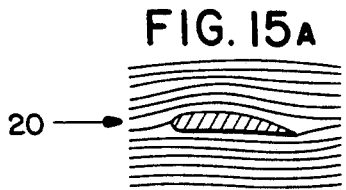
FIG. 15 is a diagram of the explanation of airfoil circulation theory taken from NACA Technical Report TR116 showing flow patterns on an infinite airfoil for 15a rectilinear, 15b circulatory, 15c combined rectilinear and circulatory flow.
FIG. 15d shows an equivalent circulation flow pattern to FIG. 15b that describes how the apertures provide additional lift on a sail when laminar flow control elements are installed in accordance with this invention.
Figure 15B:
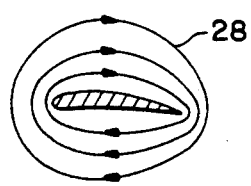
Figure 15C:
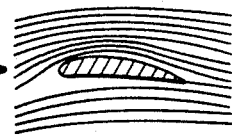
Figure 15D:
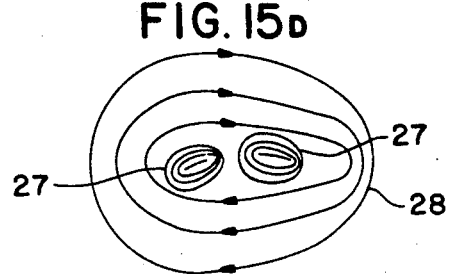

FIG. 14a is a cross-section view of a normal sail showing flow separation that occurs when rigged at high angles of attack to the relative wind. FIG. 14b is a view of the same sail cross-section showing flow attachment at the same high angles of attack of the sail in FIG. 14a with laminar flow control elements installed in accordance with the invention. FIG. 14c is an enlarged view of an aperture detailing how several airstream layers function to maintain laminar flow when apertures are installed in accordance with this invention.

FIG. 15 is a diagram of the airfoil circulation theory taken from a NACA Technical Report TR116 showing flow patterns on an infinite airfoil for 15a rectilinear, 15b combined rectilinear and circulatory flow systems. FIG. 15d shows a flow pattern equivalent to 15b for circulation flow through adjacent apertures on a sail with laminar flow control elements installed in accordance with this invention, and are an integral part of this invention.

In a general form, a sail in accordance with the invention comprises a thin airfoil having apertures therein to provide laminar boundary layer air flow and control of the air flow adjacent to the sail surface, and to improve the aerodynamic effectiveness of the sail. The improvement is obtained by locating apertures through the sail in discrete rows, the axis of the rows generally normal to the relative wind flowing over the sail surface. The rows of apertures are spaced from the stern and bow edges of the sail and the adjacent rows are spaced from each other at a distance that is calculated from a Reynolds number between 500,000 and 600,000. The Reynolds number is equal to relative wind velocity times the calculated distance divided by standard air kinematic viscosity. The rows extend upward from the sail base until an intercept with the sail edges occur. The width of the apertures parallel to the relative wind is sufficient to allow portions of the windward air flow of sufficient thickness to be "bleed vented" through the apertures to the leeward side of the sail nearly parallel to the surface of sail leeward side. The "bleed" air flow process vents the windward boundary layer air through the aperture and gently lifts the leeward side boundary layer air off the sail surface and starts a new boundary layer of the laminar-air-flow type on each side of the sail where the air impinges the downward edge of the aperture.

Two patterns of rows of apertures may be installed in a sail in accordance with the invention. The axis of the first of said aperture patterns is installed parallel to the stern edge of the sail. The axis of the second aperture pattern is installed parallel to the bow edge of the sail. The aperture patterns intercept each other from place to place as the two patterns extend upward from the sail base toward the top of the mast. The preferred intersection of the aperture patterns is the first row (from the stern edge) of the first pattern intersecting the first row (from the bow edge) of the second pattern and sequentially in like numbered row pairs until all possible paired intersections occur.

Alternatively, the apertures in each row may be installed in a line parallel to the relative wind over the sail, beginning with the first aperture in each row at the base of the sail and continuing with the second aperture in each row, and each successive "ith" aperture thereafter until all "ith" holes rows are in line and parallel with the relative wind.

The apertures may be reinforced with preferably thin, high strength and high stiffness tape material bonded on opposite sides of the sails. The tape alignment is centered on axis of the rows of apertures. The width of the tapes are as wide as necessary to properly strengthen the sails so that the apertures may be located as close as possible to each other along the row axes. The tapes may be sewn to the sail using buttonhole stitches around the aperture edges with rows of stitches parallel to the tape edges. The stitch installation to be of pitch and strength standard to the art of sail making.

The apertures may be holes or slots with diameters and slot widths equal to the aperture width described above. Slot length may be as long as material strength and stiffness can resist sail forces and form a smooth sail.

The apertures may be obtained by using panels of material, with the material width the same as the Reynolds number distance calculated in the manner described above. The panel edges are aligned parallel to the edges of the apertures in the rows. The spacing of the panels are at the aperture width described above from each other. The panel total area and edge shape is equivalent to the sail described above in the first form. The panels may be assembled to each other by an array of narrow strips preferably of high strength and stiffness material bonded opposite to each other to both sides of the sail parallel to the air flow over the sail. The strips may be widened from place to place to allow ribs to be installed in a smooth passage therein of sufficient width centered in the middle of the wide strip, the ribs to be tapered in cross-section at each end to allow the wind forces to shape the rib into an airfoil contour. The contour is preferably equivalent to the top surface of a low velocity wing section. The edges of the sail are trimmed to the shape of the sail and reinforced with tape preferably folded around the edges of the sail and bonded to both sides of the sail tapes and strips. The panels, strips and edges may be sewn together using strong thread as is standard practice in sail fabrication with some loss of strength and stiffness.

A sail may be equipped with a slot-type laminar air flow control system in accordance with the invention that is integrally woven into the sail material. Larger diameter thread is woven into the sail replacing the reinforcing tape material of claim 4 that is perpendicular to the relative wind. The diameter of the threads of the sail material in between the slots is increased to locally increase sail strength parallel to the relative wind. The thread reinforcement is sized as may be required to resist internal sail forces. The slots may be as long as the size, strength and stiffness that the reinforcing thread permits. Additional elements are bonded to all edges of the sail assembly to form a smooth sail contour.

In an alternative embodiment, a glidechute type parachute canopy of air foil shape in accordance with the invention is equipped with a slot-type laminar air flow control system integrally woven into the canopy material. The parachute planform is generally rectilinear and of sufficient area to properly support a payload when in freefall or gliding as may be the case. The orientation of the slot rows and thread reinforcement is parallel to the glidechute leading edge. The narrow reinforcement is located parallel to the relative air flow over the airfoil. Riser lines are connected as required in the same locations as the narrow reinforcement as is the practice in parachute fabrication. The riser lines are attached to and packaged in a deployment container with attachment devices such as a harness attachment thereto as is standard practice to the art of parachute fabrication.

In a further embodiment, the invention comprises the wing of an airplane, designed to fly with a single layer of a thin airfoil shaped material, constructed with the row of slots and reinforcement oriented parallel to the leading edge of the wing. Such a wing may be constructed by weaving into the airfoil material the apertures which control air flow in accordance with the invention as described above. For example, the narrow thread may be oriented parallel to the local air flow in a position equivalent to a wing rib. Some of the narrow thread groups may be enlarged in width to permit a passage of sufficient size to permit installation of a rigid structure that is shaped to the desired airfoil contour. The airfoil shaped structure when attached to the wing leading edge, spar if any, and wing trailing edge structure completes the plan-form requirements of the wing. The tips of the wings are terminated in a panel contoured in the planform of low velocity aircraft wing tip design.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. In a sail of a substantially smooth, thin airfoil shape characterized by a single continuous contour, a substantially smooth windward surface, and a substantially smooth leeward surface, means for establishing and maintaining laminar air flow over said smooth sail surfaces, said means comprising apertures installed substantially flush with said contour in said sail to bleed high energy air from said windward surface of said sail through said apertures to the leeward side of the sail, thereby removing the windward surface boundary layer and lifting the leeward surface boundary layer off said leeward surface and starting a laminar type boundary layer of air flow on each of said leeward and windward surfaces of said sail downwind of said aperture.

2. The sail of claim 1 further characterized by a bow edge and a stern edge, and said apertures comprises a first row of apertures extending along an axis which is substantially parallel to said sail bow edge and spaced toward said stern edge from said bow edge by a distance which is substantially equal to a Reynolds number of between 500,000 and 600,000 multiplied by the air kinematic viscosity, the resultant quantity divided by the relative wind velocity.

3. The sail of claim 2 wherein said apertures further comprise a second row of apertures extending along an axis which is substantially parallel to said sail stern edge and spaced forward toward said bow edge from said stern edge by a distance which is substantially equal to a Reynolds number of between 500,000 and 600,000 multiplied by the air kinematic viscosity, the quantity divided by the relative wind velocity.

4. The sail of claim 1 further characterized in that there are a plurality of rows of said apertures, and wherein respective apertures in each row define a line which is substantially parallel to the relative wind over the sail.

5. The sail of claim 1 wherein said apertures are reinforced with thin, high strength and high stiffness tape material attached on opposite sides of said sail.

6. The sail of claim 1 wherein said apertures comprise closely spaced holes formed in said sail material.

7. The sail of claim 1 wherein said apertures comprise closely spaced slots formed in said sail material.

8. The sail of claim 1 wherein said apertures are formed by the edges of transverse panels of sail material assembled to each other by an array of narrow strips to form a single smooth continuous surface using high strength and stiffness material bonded to both sides of said sail parallel to the air flow over the sail.

9. The sail of claim 1 wherein said apertures are defined by relatively large diameter threads woven in said sail material along directions perpendicular and parallel to the relative wind, and wherein the removal of said sail material from between said large thread groups forms the aperture.

10. In a sail of a smooth, thin airfoil shape characterized by a single continuous contour, a windward surface and a leeward surface, means for establishing and maintaining laminar air flow over said sail surfaces, said means comprising one or more rows of closely spaced apertures installed in said sail substantially flush with said contour to bleed high energy air from said windward surface of said sail through said apertures to the leeward side of the sail, thereby removing the windward surface boundary layer and lifting the leeward surface boundary layer off said leeward surface and starting a laminar type boundary layer of air flow on each of said leeward and windward surfaces of said sail downwind of said aperture.

11. The sail of claim 10 further characterized by a bow edge and a stern edge, and wherein said one or more rows comprises a first row extending along an axis which is substantially parallel to said sail bow edge and spaced from said bow edge by a distance which is substantially equal to a Reynolds number of between 500,000 and 600,000 multiplied by the air kinematic viscosity, the quantity divided by the relative wind velocity.

12. The sail of claim 11 wherein said one or more rows comprises a second row extending along an axis which is substantially parallel to said sail stern edge and spaced from said stern edge by a distance which is substantially equal to a Reynolds number of between 500,000 and 600,000 multiplied by the air kinematic viscosity, the quantity divided by the relative wind velocity.

13. The sail of claim 12 wherein said sail is further characterized by a bottom edge, said stern, bow and bottom edges generally defining a triangular shaped configuration, and wherein said first and second rows meet near the top of the sail.

14. The sail of claim 10 further characterized in that there are a plurality of rows of said apertures, and wherein respective apertures in each row define a line which is substantially parallel to the relative wind over the sail.

15. The sail of claim 10 wherein said apertures are reinforced with thin, high strength and high stiffness tape material attached on opposite sides of said sail.

16. The sail of claim 10 wherein said apertures comprise closely spaced holes formed in said sail material substantially normal to said sail contour.

17. The sail of claim 10 wherein said apertures comprise closely spaced slots formed in said sail material substantially normal to said sail contour.

18. The sail of claim 10 wherein said apertures are formed by the edges of transverse panels of sail material and wherein said panels are assembled substantially parallel to each other by an array of narrow strips of high strength and stiffness material bonded to both sides of said sail opposite to each other parallel to the air flow over the sail to substantially form a continuous contour.

19. The sail of claim 10 wherein said apertures are defined by relatively large diameter threads woven in said sail material along directions perpendicular and parallel to the relative wind, and wherein the removal of said sail material from between groups of said large diameter threads defines said apertures.

20. A thin airfoil sail of a substantially smooth, thin airfoil shape characterized by a single continuous contour and having apertures installed substantially flush with said contour to improve its aerodynamic effectiveness through laminar airflow control, wherein said apertures are formed in discrete rows, said rows of apertures being formed in a linear array having an axis generally normal to the relative wind flowing over the sail surface, said sail having a base edge and an upper edge, said rows of apertures extending upwardly from the sail base edge until an intersection with said upper sail edge occurs, said apertures in each of said rows being installed in a line parallel to the relative wind over said sail, beginning with the first aperture in each row at the base of said sail and continuing with the second line of apertures in each row upwardly from said sail base, and each successive aperture line upwardly thereafter until all aperture lines in each row are aligned and parallel with the relative wind passing over the sail.

21. The sail of claim 20, wherein said apertures are reinforced with preferably thin, high strength and high stiffness tape material bonded opposite each other on each side of the sail, the tape alignment being centered on axis of the rows of apertures.

22. The sail of claim 20 wherein said apertures comprise holes defined in said sail.

23. The sail of claim 20 wherein said apertures comprise slots defined in said sail.

24. A sail designed as a thin airfoil having apertures therein to improve aerodynamic effectiveness through laminar airflow control, said sail having a windward side surface and leeward side surface, a leading edge, a trailing edge, a base edge, and an upper edge, the improvement comprising:

said apertures being formed in discrete rows, each said row extending substantially vertically from said base edge of said sail toward said upper edge of said sail, each said row having a longitudinal axis, said longitudinal axis being oriented substantially normal to the direction of airflow over said leeward side surface of said sail;

a first row of said apertures being spaced a distance from the leading edge of said sail toward said trailing edge of said sail, said distance being substantially equal to the distance from said leading edge to a point on said leeward side surface of said sail where airflow would change from laminar flow to turbulent flow for a given wind velocity in which use of said sail is designed, said sail being flat, and absent any airflow control, each row of said apertures following said first row of apertures being spaced toward the trailing edge from adjacent rows of said apertures said distance;

substantially each aperture in said first row of apertures being horizontally aligned with at least one aperture of a following row toward the trailing edge so as to present a line of apertures substantially parallel to the airflow across said leeward side surface of said sail;

each said aperture having an interior edge, each said interior edge being strengthened by reinforcement material; and wherein said rows of apertures bleed high energy air from said windward side of said sail to said leeward side of said sail to start a new laminar-type boundary layer on said leeward side and on said windward side of said sail downwind of each row of said apertures providing high dynamic lift forces over said sail.

25. A sail designed as a thin airfoil having two sets of apertures therein to improve aerodynamic effectiveness through laminar airflow control, said sail having a windward side surface and a leeward side surface, a leading edge, a trailing edge, a base edge, and an upper edge, the improvement comprising:

two sets of apertures, the first set of apertures being formed in discrete rows, each said row extending substantially vertically from said base edge of said sail toward said upper edge of said sail, each said row having a longitudinal axis, said longitudinal axis being oriented substantially parallel to the leading edge of said sail;

a first row of said first set of apertures being spaced a distance from the leading edge of said sail said distance being substantially equal to the distance from said leading edge to a point on said leeward side surface of said sail wherein airflow would change from laminar flow to turbulent flow for a given wind velocity in which use of said sail is designed, said sail being flat, absent of any airflow control;

each row of said first set of apertures following said first row of said apertures being spaced toward the trailing edge from adjacent rows of said apertures said distance;

substantially each aperture in said first row of apertures being horizontally aligned with at least one aperture of a following row toward the trailing edge so as to present a line of apertures substantially parallel to the airflow across said leeward side surface of said sail;

in the second set of said apertures, said apertures being formed in discrete rows, each said row extending substantially vertically from said base edge of said sail and parallel to said trailing edge of said sail, toward said upper edge of said sail, each said row having a longitudinal axis, said longitudinal axis being oriented substantially parallel to said trailing edge of said sail;

a first row of said second set of apertures being spaced said distance from the trailing edge of said sail;

each row of said apertures of said second set preceding said first row of said apertures from said trailing edge, being spaced from adjacent rows of said second set of apertures said distance;

substantially each aperture in said first row of said second set of apertures being horizontally aligned with at least one aperture of a row of said second set so as to present a line of apertures substantially parallel to the airflow across said leeward side surface of said sail, the horizontal rows of apertures of said second set of apertures substantially in line with the horizontal rows of said first set of apertures so as to present a line of apertures through said first set and said second set of apertures substantially parallel to the airflow across said leeward side surface of said sail;

and wherein a first row pair is substantially formed when the first row of said first set of apertures intersects the first row of said second set of apertures when said rows of apertures are extended upward from said base edge of said sail toward said upper edge of said sail, a second row pair being formed when a second row of said first set of apertures intersects a second row of said second set of apertures when said rows of apertures are extended upward from said base edge of said sail toward said upper edge of said sail, each subsequent row pair being formed for said rows of apertures from said first set of apertures and said second set of apertures, when extended upward from said base edge of said sail toward said upper edge of said sail, said row pairing terminating near the center of said sail;

each said aperture in said first set and said second set of apertures having an interior edge, each said interior edge being strengthened by reinforcement material; and wherein said row of apertures bleed high energy air from said windward side of said sail to said leeward side of said sail to start a new laminar type boundary layer on said leeward side and on said windward side of said sail downwind of each row of said apertures providing high dynamic lift forces over said sail.

26. In a sail characterized by a windward surface, a leeward surface, a bow edge, a bottom edge and a stern edge, and wherein said stern, bow and bottom edges generally define a triangular shaped configuration means for establishing and maintaining laminar air flow over said sail surfaces, said means comprising apertures installed in said sail to bleed high energy air from said windward surface of said sail through said apertures to the leeward side of the sail, thereby removing the windward surface boundary layer and lifting the leeward surface boundary layer off said leeward surface and starting a laminar type boundary layer of air flow on each of said leeward and windward surfaces of said sail downwind of said aperture, and said apertures comprise:

(i) a first row of apertures extending along an axis which is substantially parallel to said sail bow edge and spaced from said bow edge by a distance which is substantially equal to a Reynolds number of between 500,000 and 600,000 multiplied by the air kinematic viscosity, the quantity divided by the relative wind velocity;

(ii) a second row of apertures extending along an axis which is substantially parallel to said sail stern edge and spaced from said stern edge by a distance which is substantially equal to a Reynolds number of between 500,000 and 600,000 multiplied by the air kinematic viscosity, the quantity divided by the relative wind velocity;

and wherein said first and second rows meet near the top of the sail.

* * * * *

UNITED STATES PATENT AND TRADEMARK OFFICE
CERTIFICATE OF CORRECTION

PATENT NO. : 5,123,368
DATED : June 23, 1992
INVENTOR(S) : Duc H. Tran, David A. Reed, Jr.

It is certified that error appears in the above-identified patent and that said Letters Patent is hereby corrected as shown below:

Column 1, line 44, delete "upward edger" and insert in lieu thereof --upwind edges--.
Column 2, line 21, delete "no" and insert in lieu thereof --new--.
Column 3, line 12, delete "pari" and insert in lieu thereof --pair--.
Column 4, line 64, delete "rows" and insert in lieu thereof --patterns--.
Column 5, line 5, delete "a" and insert in lieu thereof --all--; line 36, after the word "Panels" insert --29--; line 56, delete "type" and insert in lieu thereof --tape--.
Column 6, line 39, delete "1" and insert in lieu thereof --19--; line 44, after the word flow, insert --19--.
Column 7, line 8, delete "prot" and insert in lieu thereof --port--; line 50, after "rectilinear," insert --15b circulatory--; line 51, delete "15b" and insert in lieu thereof --15c--.
Column 8, line 14, delete "downward" and insert in lieu thereof --downwind--; line 29, delete "Alternatively" and insert in lieu thereof --Additionally--.

Signed and Sealed this

Fourteenth Day of September, 1993

Attest:

BRUCE LEHMAN

*Attesting Officer*   *Commissioner of Patents and Trademarks*